Patented Feb. 8, 1949

2,461,016

UNITED STATES PATENT OFFICE 2,461,016

PRODUCTION OF ENOL ACETATES

Frank G. Young, Charleston, W. Va., assignor to Carbide and Carbon Chemicals Corporation, a corporation of New York No Drawing. Application July 27, 1946, Serial No. 686,714

7 Claims. (Cl. 260—488)

This invention relates to the production of enol acetates, and more especially it concerns a process for the condensation of ketene with ketones for the production of acetoxy-substituted alkenes or enol acetates in high yields and with good efficiencies.

The invention is based in important part upon the discovery that by condensing ketene with ketones in the presence of a certain class of catalysts for the condensation which have been found to be milder in their action upon the starting materials and upon the resultant products than catalysts heretofore used, higher efficiencies can be secured and purer enol acetates obtained.

The ketones which can be converted by the process are those aliphatic, aromatic and mixed open chain and cyclic ketones having at least three replaceable hydrogen atoms attached to the carbon atoms directly connected with a carbonyl carbon atom of the ketone. Ketones having two or more hydrogen atoms on each of the carbon atoms adjacent the carbonyl carbon atom are particularly useful. Among ketones convertible by the process are saturated aliphatic ketones such as acetone, methyl ethyl ketone, methyl isobutyl ketone, ethyl n-hexyl ketone, diisobutyl ketone and di n-caprone; olefinic ketones such as methyl vinyl ketone, ethyl vinyl ketone, ethylidene acetone and mesityl oxide; saturated cyclic ketones such as cyclopentanone, cyclohexanone and cyclononanone; unsaturated cyclic ketones such as isophorone; and aromatic and mixed aromatic ketones such as methyl phenyl ketone, methyl benzyl ketone, n-propyl phenyl ketone, and phenyl benzyl ketone.

The preferred catalysts having outstanding utility for the condensation of ketene and ketones to form enol acetates in accordance with the invention are certain aliphatic mono- and disulfonic acids, and hydrates thereof, including the sulfonic acid derivatives of the fatty acids, and especially those of the lower saturated fatty acids having from one to six carbon atoms, such as sulfoacetic acid and the monohydrate thereof, 2-sulfopropionic acid, 3-sulfopropionic acid, 2-sulfobutyric acid, 2-sulfoisobutyric acid and other sulfocarboxylic acids; alkane disulfonic acids, and dihydrates thereof, such as methionic acid, 1,2-ethane disulfonic acid and the dihydrate thereof, 1,1'-ethane disulfonic acid, 1,1'-propane disulfonic acid, 1,2-propane disulfonic acid, 1,3-propane disulfonic acid, 1,2-butane disulfonic acid, 1,3-butane disulfonic acid, 1,4-butane disulfonic acid, and similar disulfonic acids having their respective sulfur atoms connected to the same carbon atom of an alkane group or to different carbon atoms of an alkane group, and which may be regarded as sulfonic acid derivatives of the alkylene glycols (see Richter's Organic Chemistry, Allott, vol. 1, p. 377); and substituted alkyl sulfonic acids wherein one or more of the hydrogen atoms of the alkyl group is replaced by a corresponding number of halogen atoms, such as 2-bromoethane sulfonic acid, 2-chloroethane sulfonic acid, chloroiodomethane sulfonic acid, and other chloro-, bromo-, and iodo-substituted alkyl sulfonic acids.

Unsubstituted alkyl monosulfonic acids and the alkylene monosulfonic acids, on the contrary, are not active catalysts for the reaction of ketene and ketones for the production of enol acetates.

The compounds found to be useful as catalysts in the process may be designated by the formula

wherein X represents an alkyl group having one or more hydrogen atoms replaced by a corresponding number of radicals selected from the class consisting of the carboxyl radical, the sulfonic acid radical, and the halogen atoms. Those compounds in which the alkyl group contains from one to four carbon atoms are particularly useful, but compounds having more than four carbon atoms in the alkyl group may be employed. Such substituted sulfonic acids are not readily subject to hydrolysis by water or even by boiling caustic alkalies, hence are active per se as catalysts.

These substituted alkyl sulfonic acids may be made by any of several known processes, such as by reaction of alkyl dihalides with alkali metal sulfites and acid sulfites; by oxidation of mercaptans, alkyl thiocyanates, alkyl disulfides and alkyl sulfinic acids; by sulfonation of alcohols and ethers; and by sulfo-chlorination of aliphatic hydrocarbons with a mixture of sulfur dioxide and chlorine, followed by hydrolysis of the sulfonyl chloride so formed.

Other classes of catalysts which are efficient in the process are esters and mixed anhydrides of sulfuric acid. These include sulfonic acid derivatives having in their structure at least one sulfur atom that is not directly connected to a carbon atom. Examples of these catalysts are chlorsulfonic acid, acetyl sulfuric acid and ethylidene disulfonic disulfuric acid wherein every sulfur atom is not directly connected to a carbon atom. Such catalysts are subject to fairly rapid hydrolysis in the presence of water. Therefore it is important that these catalysts be maintained in anhydrous form throughout the condensation and the enol-ester isolation stages of the process in order to prevent hydrolysis of the catalyst with resultant dehydration and polymerization of the enol acetates.

The preferred substituted alkyl sulfonic acid catalysts of the invention are much more efficient than sulfuric acid catalysts, since sulfuric acid is a strong dehydrating and oxidizing agent under the conditions of the condensation reaction and causes condensation of the reactants and of the enol-esters with resultant lower yields of the desired enol-esters.

According to a preferred form of the invention, a stream of ketene is introduced slowly at a regulated rate into a solution or suspension of the catalyst in the desired ketone while agitating the mixture and maintaining it at a suitable elevated temperature below that at which substantial polymerization of the ketene occurs. Generally an amount of catalyst corresponding to between 0.1% and 2% of the ketone gives excellent results. The reactants preferably are substantially dry or anhydrous to minimize side reactions of moisture with the ketene. The temperatures found most efficient vary with the ketone employed, usually ranging from around 55° C. to around 100° C. However, lower and higher temperatures may be used.

A preferred method for the isolation of the enol-esters from the reaction mixture involves the fractional distillation from the condensation reaction mixture of the enol-ester, excess ketone and the catalyst. Near the end of the distillation the enol-ester remains in contact with a high concentration of the catalyst at high temperatures where, when using the highly oxidizing catalysts, the enol-ester is resinified and discolored with consequent decrease in yield and purity. The substituted alkyl sulfonic acids of the invention are not such strong dehydrating and oxidizing agents, while being fully as active catalysts for the condensation reaction forming the enol esters. Therefore, use of the latter inhibits or limits side reactions both in the condensation step and in the isolation and recovery steps. They provide higher yields of the enol esters in shorter reaction periods, with attendant savings in equipment and raw material costs.

The following examples serve to illustrate the invention. In the examples all parts are given in terms of weight unless otherwise stated.

EXAMPLE I

A solution of 2 parts of anhydrous sulfoacetic acid in 406 parts of dry acetone was heated to 55° C. with agitation in a glass vessel during a period of 0.75 hour while passing a stream of ketene through the solution at the rate of 110 grams per hour, whereupon the absorption of the ketene was rapid and complete. The acidic catalyst then was neutralized by the addition of anhydrous sodium acetate to the reaction mixture. The mixture was fractionally distilled under an absolute pressure of 200 mm. of mercury, and 108 parts of isopropenyl acetate, boiling at 58° C.-60° C. at 200 mm. of mercury pressure, and 321 parts of unreacted acetone were separately recovered. This corresponds to a yield of enol-ester of 77% based upon the acetone.

It is not necessary to neutralize the acidic catalyst prior to the fractional distillation for the isolation of the enol acetate; and equally good results are secured when omitting this step, as illustrated in Example II.

EXAMPLE II

A solution of 6 parts of anhydrous sulfoacetic acid in 1,200 parts of dry acetone was heated to 55° C. with agitation in a glass vessel during a period of 2.25 hours while passing a stream of ketene through the solution at the rate of 110 grams per hour, whereupon the absorption of ketene was rapid and complete. The mixture was fractionally distilled under an absolute pressure of 200 mm. of mercury, and 457 parts of isopropenyl acetate, and 928 parts of unreacted acetone were separately recovered. This corresponds to a yield of enol-ester of 100% based upon the acetone consumed.

EXAMPLE III

Following the procedure recited in Example I, with the exception that 2 parts of an 87% aqueous solution of sulfoacetic acid monohydrate was used as the catalyst, a yield of isopropenyl acetate of 73%, based upon the acetone, was secured.

EXAMPLE IV

Under the conditions described in Example I, with the exception that 2 parts of 1,2-ethane disulfonic acid were employed as the catalyst, a yield of isopropenyl acetate of 74% was secured, based upon the acetone.

EXAMPLE V

Following the conditions recited in Example I, with the exception that 2 parts of methionic acid (methane disulfonic acid) were employed as the catalyst, a yield of isopropenyl acetate of 74%, based upon the acetone, was secured.

EXAMPLE VI

Following the procedure recited in Example I, with the exception that 2 parts of 2-bromoethane sulfonic acid were used as the catalyst, a considerably lower yield of isopropenyl acetate, based upon the acetone, was secured.

The bromoethane sulfonic acid was made by reacting equimolecular proportions of ethylene dibromide and sodium sulfite in aqueous solution, acidifying with anhydrous hydrogen chloride, and recrystallizing the resultant acid from a mixture of ethanol and ethyl ether.

EXAMPLE VII

Over a period of one hour 220 parts of ketene were diffused into an agitated solution of 3.4 parts of sulfoacetic acid monohydrate in 600 parts of acetophenone heated to 90° C.-95° C. The ketene was rapidly absorbed during the reaction period. Fractional distillation of the resultant reaction mixture under vacuum yielded 670 parts of α-acetoxy styrene, boiling at 83° C. to 88° C. under a pressure of 3.5 mm. of mercury, and having a specific gravity at 20°/15.5 C. of 1.073, and a refractive index of $N_D^{30}$ 1.5299. This represents an efficiency of 83%, based on the acetophenone, and a yield and efficiency of 79%, based on the ketene.

EXAMPLE VIII

Over a period of one hour 137 parts of ketene were introduced into an agitated solution of 3.4 parts of anhydrous sulfoacetic acid in 691 parts of cyclohexanone. Upon fractional distillation of the resultant reaction mixture under vacuum, there were recovered 278 parts of unreacted cyclohexanone, and 387 parts of cyclohexenyl acetate having the following properties: boiling point, 98° C. at 48 mm. of mercury, absolute; $N_D^{30}=1.4541$. This represents an efficiency of 66%, based upon the cyclohexanone, and a yield and efficiency of 85% based on the ketene.

EXAMPLE IX

During a period of one hour 84 parts of ketene were introduced into an agitated body of 358 parts of diisobutyl ketone containing 2.5 parts of 1,2-ethane disulfonic acid dihydrate and maintained at 90° C. After completion of the reaction the reaction mixture was fractionally distilled under vacuum, yielding 157 parts of unreacted ketone and 268 parts of 2,6-dimethyl-4-acetoxy heptene-3, boiling at 73° C.–76° C. under a pressure of 12 mm. of mercury, and having a refractive index $N_D^{30}$ of 1.4208. This corresponds to a yield of 58% and an efficiency of 100%, based upon the ketone, and a yield of 73% based upon the ketene.

EXAMPLE X

Over a period of one hour 125 parts of ketene were introduced within an agitated mixture of 482 parts of mesityl oxide and 2.5 parts of anhydrous 1,2-ethane disulfonic acid maintained at 90° C. Upon fractional distillation of the resultant reaction mixture under vacuum, there were separately recovered 201 parts of 2-acetoxy-4-methyl pentadiene-1,3, and 348 parts of unreacted mesityl oxide. This corresponds to a yield of 49% based upon the ketene, and an efficiency of 96%, based upon the mesityl oxide consumed.

The following table illustrates the greatly improved efficiencies based upon ketene that are secured when using the catalysts of this invention over the mineral acid catalysts such as sulfuric acid, due to the effect of the former catalysts in inhibiting the thermal decomposition of the ketene to form resins at the high catalyst concentrations and elevated temperatures required in the recovery step.

*Table*

[Comparison of sulfuric acid and substituted alkyl sulfonic acids as catalysts for the reaction of ketene and acetone]

| Run | Catalyst | Catalyst, percent, based on the ketone | Reaction Time, Hours | Yield and Efficiency, based on ketene | Yield, percent per hour, based on acetone |
|---|---|---|---|---|---|
| 1 | A | 0.5 | 0.75 | 54.0 | 20.0 |
| 2 | B | 0.5 | 0.75 | 58.0 | 21.4 |
| 3 | C | 0.5 | 0.75 | 60.0 | 22.7 |
| 4 | D | 0.5 | 0.75 | 58.0 | 21.4 |
| 5 | H₂SO₄ | 1.15 | 0.75 | 28.4 | 7.2 |
| 6 | do | 1.15 | 2.5 | 51.0 | 12.9 |
| 7 | do | 1.15 | 5.5 | 27.5 | 7.0 |

In the table catalyst A is ethane disulfonic acid, B is sulfoacetic acid, C is sulfoacetic acid monohydrate, and D is ethane disulfonic acid dihydrate.

It will be observed that the substituted alkyl sulfonic acids, alkane disulfonic acids, and hydrates thereof, give substantially higher yields and efficiencies based upon ketene than are obtained with sulfuric acid, and in fact give efficiencies comparable to those obtained by the use of more than twice the amount of sulfuric acid. Moreover, it will be noted from a comparison of runs 1 and 6 that, when using the catalysts of this invention, equal yields of enol acetates are obtained in about one-third the reaction time employed when using sulfuric acid as the catalyst.

The expressions "sulfocarboxylic acid," "sulfonic acid derivative of a fatty acid," "sulfonic acid derivative of a halogenated alkane," "sulfoacetic acid" and similar expressions appearing in the claims to define the catalysts, are intended to include not only the acids but also the hydrates of such acids.

The use of catalysts in the process of alkane disulfonic acids and disulfonic derivatives of alkylene glycols are specifically claimed in applicant's copending application, Serial No. 686,715, filed concurrently herewith, now Patent No. 2,461,017, dated February 8, 1949, which is a division of this one.

The invention is susceptible of modification within the scope of the appended claims.

I claim:

1. In the process for producing enol acetates, the step which comprises intimately mixing and condensing at an elevated temperature successive portions of ketene with a ketone having at least three hydrogen atoms connected with the carbon atoms alpha to a keto carbon atom, in the presence of a catalyst corresponding to the formula

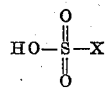

wherein X represents an alkyl group having at least one hydrogen atom thereof substituted by a corresponding number of radicals selected from the class consisting of the carboxyl radical, and the halogen radicals.

2. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of a sulfocarboxylic acid as catalyst.

3. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of a sulfonic acid derivative of a fatty acid as catalyst.

4. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of a sulfonic acid derivative of a fatty acid having from one to four carbon atoms as catalyst.

5. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of sulfoacetic acid as catalyst.

6. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of a sulfopropionic acid as catalyst.

7. In the process for producing enol acetates, the step which comprises intimately mixing and condensing successive portions of ketene with a ketone having at least three hydrogen atoms connected with the carbon atoms alpha to a keto carbon atom, at an elevated temperature, in the presence of a sulfobutyric acid as catalyst.

FRANK G. YOUNG.

REFERENCES CITED

The following references are of record in the file of this patent:

UNITED STATES PATENTS

| Number | Name | Date |
|---|---|---|
| 2,383,965 | Gwynn et al. | Sept. 4, 1945 |
| 2,407,301 | Spence et al. | Sept. 10, 1946 |